United States Patent
Korenblit et al.

(10) Patent No.: US 7,508,578 B2
(45) Date of Patent: Mar. 24, 2009

(54) MAGNON LASER

(75) Inventors: Yehiel Korenblit, Netanya (IL); Boris G. Tankhilevich, Walnut Creek, CA (US)

(73) Assignee: Terahertz Technologies, LLC, Walnut Creek, CA (US)

( * ) Notice: Subject to any disclaimer, the term of this patent is extended or adjusted under 35 U.S.C. 154(b) by 0 days.

(21) Appl. No.: 11/701,284

(22) Filed: Jan. 31, 2007

(65) Prior Publication Data

US 2008/0095208 A1    Apr. 24, 2008

Related U.S. Application Data

(63) Continuation of application No. 11/481,197, filed on Jul. 3, 2006, now Pat. No. 7,430,074.

(51) Int. Cl.
*H01S 4/00* (2006.01)
*H01S 3/00* (2006.01)

(52) U.S. Cl. .................. 359/342; 372/37; 372/43.01

(58) Field of Classification Search ............... 359/342; 372/37, 43.01
See application file for complete search history.

(56) References Cited

U.S. PATENT DOCUMENTS 3,822,410 A    7/1974    Madey

2002/0058120 A1*    5/2002    Uchida et al. ............. 428/64.4

OTHER PUBLICATIONS

M. W. Shaper and T. R. McGuire, "Studies of Curie-Point Increases in EuO", Journal of Applied Physics, Feb. 1968, pp. 588-590, vol. 39, No. 2.
M. I. Kaganov and V. M. Tsukernik, "NonResonance Absorption of Oscillating Magnetic Field Energy by a Ferromagnetic Dielectric", Soviet Physics JETP, Mar. 1960, pp. 587-592, vol. 37 (10), No. 3.
V. G. Vaks, A. I. Larkin, and S. A. Pikin, "Spin Waves and Correlation Functions in a Ferromagnetic", Zh. Eksp. Teor. Fiz. (U.S.S.R.) 53, 1089-1106 (Sep. 1967), pp. 647-655.
I. Ya. Korenblit and B. G. Tankhilevich, "High Frequency Magnon Generation by NonEquilibrium Electrons And The Instability Of The Magnon System", Physics Letters, pp. 307-308, vol. 64A, No. 3.
I. Ya. Korenblit and B. G. Tankhilevich, "Generation of High-Frequency Magnons In A Ferromagnetic Semiconductor", Pis'ma Zh. Eksp. Teor. Fiz. 24, No. 11, pp. 598-601 (Dec. 5, 1976).
I. Ya. Korenblit and B. G. Tankhilevich, "Generation Of High-Frequency Magnons by NonEquilibrium Electrons Polarized Opposite To The Direction Of Magnetization", Soviet Physics JETP, Dec. 1977, pp. 1167-1175, vol. 46, No. 6.

(Continued)

*Primary Examiner*—Eric Bolda
(74) *Attorney, Agent, or Firm*—Boris G. Tankhilevich

(57) ABSTRACT

A magnon laser comprising: a magnon gain medium (MGM) that supports generation of nonequilibrium magnons, and a means for generating nonequilibrium magnons in the MGM further comprising a means for pumping nonequilibrium electrons into the MGM. Propagation of nonequilibrium electrons in the MGM causes generation of nonequilibrium magnons. The MGM is selected from the group consisting of: {ferromagnetic semiconductor; ferromagnetic insulator; and ferromagnetic material}. The merging of nonequilibrium magnons causes generation of terahertz waves.

22 Claims, 2 Drawing Sheets

OTHER PUBLICATIONS

I. Ya. Korenblit, A. A. Samokhvalov and V. V. Osipov, "Heating And Generation Of Magnons By NonEquilibrium Electrons In Ferromagnetic Semiconductors", Soc. Sci. Re. A. Phys., 1987, pp. 447-517, vol. 8, Harwood Academic Publisher GmbH.

L. Passell, O. W. Dietrich and J. Als-Nielsen, "Neutron Scattering From The Heisenberg Ferromagnets EuO and EuS. I. The Exchange Interactions", Physical Review B, Dec. 1, 1976, pp. 4897-4907, vol. 14, No. 11.

J. Schoenes and P. Wachter, "Exchange Optics In Gd-doped EuO", Physical Review B, Apr. 1, 1974, pp. 3097-3105, vol. 9, No. 7.

M. Dyakonov and M. Shur, "Shallow Water Analogy For A Ballistic Field Effect Transistor: New Mechanism Of Plasma Wave Generation By dc Current", Physical Review Letters, Oct. 11, 1993, pp. 2465-2468, vol. 71, No. 15.

J.P. Lascaray, J.P. Desfours and M. Averous, "Bound Magnetic Polaron Evidence In EuO", Solid State Communications, 1976, pp. 677-679, vol. 19, Pergamon Press.

R. Huber, B.A. Schmid, Y.R. Shen, D.S. Chemla, and R.A. Kaindl, "Stimulated Terahertz Emission From Intraexcitonic In $Cu2O$", Physical Review Letters, Jan. 13, 2006, pp. 017402-1 to 017402-4, PRL. 96, The American Physical Society.

Bradley Ferguson and Xi-Cheng Zhang, "Materials for Terahertz Science and Technology", Nature Materials, Sep. 2002, pp. 26-33, vol. 1, Nature Publishing Group.

R. Kohler, A. Tredicucci, F. Beltram, H.E. Beere, E.H. Linfield, A.G. Davies, D.A. Ritchie, R.C. Iotti and F. Rossi, "Terahertz Semiconductor-heterostructure Laser", Letters To Nature, May 9, 2002, pp. 156-159, vol. 417, Macmillian Magazines Ltd.

M. J. Lisowski, "Electron and Magnetisation Dynamics in Metals Studied by Time-Resolved Photoemission", Dissertation Abstract, Freie Universitat Berlin, Jan. 2006, Berlin Germany.

I. E. Radu, "Ultrafast Electron, Lattice and Spin Dynamics on Rare-Earth Metal Surfaces", Thesis, Freie Universitat Berlin, Mar. 2006, Berlin Germany.

R. Srivastava, "Optically Detected Terahertz Resonance Spectroscopy of Semiconductor Nanostructures", Thesis, Rice University, Apr. 2005, Houston Texas.

\* cited by examiner

MAGNON LASER

This is a continuation of the U.S. patent application Ser. No. 11/481,197, filed on Jul. 3, 2006 now U.S. Pat. No. 7,430,074 and entitled "GENERATION OF TERAHERTZ WAVES".

TECHNICAL FIELD

The current invention relates to a magnon laser.

BACKGROUND ART

In the parent patent application entitled "GENERATION OF TERAHERTZ WAVES" the generation of nonequilibrium magnons was used for generation of terahertz waves.

However, the generation of nonequilibrium magnons can be also described by using a general laser analogy.

DISCLOSURE OF THE INVENTION

The present invention discloses several embodiments of a magnon laser and its application for generation of terahertz waves.

One aspect of the present invention is directed to a general structure (GS) magnon laser.

In one embodiment, the GS magnon laser of the present invention further comprises: (A) a magnon gain medium (MGM); wherein the MGM supports generation of nonequilibrium magnons; and (B) a means for generating the nonequilibrium magnons in the MGM.

In one embodiment, the GS magnon laser of the present invention further comprises: (C) a thermostat, wherein the MGM is placed in the thermostat, and wherein the thermostat is configured to maintain temperature of the MGM below a critical temperature.

In one embodiment of the present invention, the means (A) is selected from the group consisting of: {ferromagnetic semiconductor; ferromagnetic insulator; and ferromagnetic material}.

In one embodiment of the present invention, the means (B) further comprises: a means (B1) configured to pump nonequilibrium electrons into the MGM, wherein propagation of the nonequilibrium electrons in the MGM causes generation of the nonequilibrium magnons.

In another embodiment of the present invention, the means (B) further comprises: a means (B2) configured to inject nonequilibrium electrons into the MGM, wherein propagation of the nonequilibrium electrons in the MGM causes generation of the nonequilibrium magnons.

In one more embodiment of the present invention, the means (B) further comprises: a means (B3) configured to inject nonequilibrium polarized electrons into the MGM, wherein the electrons are polarized in the direction opposite to the direction of magnetization of the MGM, and wherein propagation of the polarized nonequilibrium electrons in the MGM causes generation of the nonequilibrium magnons.

Another aspect of the present invention is directed to a four-level magnon laser further comprising: a ferromagnetic material having a conduction band that is split into two sub bands, a first subband having spin up (along the direction of magnetization of the ferromagnetic material), and a second the subband having spin down (opposite to the direction of magnetization of the ferromagnetic material). The ferromagnetic material is selected from the group consisting of: {ferromagnetic semiconductor; and ferromagnetic insulator}.

In one embodiment of the present invention, the four-level magnon laser further comprises a four-level energy structure further comprising: a lowest energy level corresponding to a valence band, a highest energy level corresponding to a spin-down subband, a second intermediate energy level corresponding to a spin-up subband, wherein electrons from the lowest energy level pumped into the highest energy level move into the lower energy electron states in the spin-up subband, and wherein each pumped electron emits a magnon, and a first intermediate level corresponding to the lower energy electron states in the spin-up subband. In this embodiment of the present invention, the electrons in the spin-up subband move into the bottom of the spin-up subband by emitting optical phonons. In this embodiment of the present invention, the second intermediate energy level is placed in the energy space lower than the first intermediate level. In this embodiment of the present invention, the electrons are pumped from the lowest energy level into the highest energy level by using a pumping means.

In one embodiment of the present invention, the four-level magnon laser further comprises: a thermostat, wherein the ferromagnetic material is placed in the thermostat, and wherein the thermostat is configured to maintain temperature of the ferromagnetic material below a critical temperature.

In one embodiment of the present invention, the four-level magnon laser further comprises a pumping means configured to pump the electrons from the lowest energy level into the highest energy level.

In one embodiment of the present invention, the pumping means further comprises: a conventional laser means configured to pump the electrons from the lowest energy level into the highest energy level.

One more aspect of the present invention is directed to a three-level magnon laser further comprising: a ferromagnetic material having a conduction band that is split into two sub bands, a first subband having spin up (along the direction of magnetization of the ferromagnetic material), and a second the subband having spin down (opposite to the direction of magnetization of the ferromagnetic material). The ferromagnetic material is selected from the group consisting of: {ferromagnetic semiconductor; and ferromagnetic insulator}.

In one embodiment, the three-level magnon laser of the present invention further comprises a three-level laser structure further comprising: a highest energy level corresponding to a spin-down subband, a lowest energy level corresponding to a spin-up subband, wherein electrons injected from an external source of electrons into the highest energy level move into the lower energy electron states in the spin-up subband, and wherein each injected electron emits a magnon, and an intermediate energy level corresponding to the lower energy electron states in the spin-up subband. In this embodiment of the present invention, the electrons in the spin-up subband move from the intermediate energy level into the bottom of the spin-up subband by emitting optical phonons. In this embodiment of the present invention, the electrons are injected from the external source of electrons into the highest energy level by using an injection means.

In one embodiment, the three-level magnon laser of the present invention further comprises a thermostat, wherein the ferromagnetic material is placed in the thermostat, and wherein the thermostat is configured to maintain temperature of the ferromagnetic material below a critical temperature.

In one embodiment, the three-level magnon laser of the present invention further comprises: the injection means configured to inject the electrons from the external source of electrons into the highest energy level.

In one embodiment of the present invention, the injection means further comprises: an electric field applied to the ferromagnetic material. In one embodiment of the present invention, the injection means is configured to inject non-polarized electrons from an external source into the ferromagnetic material, wherein the injected spin-down electrons populate the highest energy level. In another embodiment of the present invention, the injection means is configured to inject polarized spin-down electrons from an external source into the highest energy level, wherein the polarized spin-down electrons are polarized in the direction opposite to the direction of magnetization of the ferromagnetic material.

An additional aspect of the present invention is directed to a method for generation of nonequilibrium magnons by using a GS magnon laser.

In one embodiment of the present invention, the method of the present invention for generation of nonequilibrium magnons by using the GS magnon laser further comprises: (A) providing a magnon gain medium (MGM) that supports generation of nonequilibrium magnons; and (B) generating the nonequilibrium magnons in the MGM.

In one embodiment of the present invention, the step (A) further comprises: (A1) placing the MGM in a thermostat to maintain temperature of the MGM below a critical temperature.

In one embodiment of the present invention, the step (A) further comprises: (A2) selecting the MGM from the group consisting of: {ferromagnetic semiconductor; ferromagnetic insulator; and ferromagnetic material}. In one embodiment of the present invention, the step (A2) further comprises: (A2, 1) placing the MGM comprising the selected ferromagnetic material into the thermostat to maintain temperature of the selected ferromagnetic material below its Curie temperature.

In one embodiment of the present invention, the step (B) further comprises: (B1) pumping nonequilibrium electrons into the MGM, wherein propagation of the nonequilibrium electrons in the MGM causes generation of the nonequilibrium magnons.

In one embodiment of the present invention, the step (B) further comprises: (B2) injecting nonequilibrium electrons into the MGM, wherein propagation of the nonequilibrium electrons in the MGM causes generation of the nonequilibrium magnons.

In one embodiment of the present invention, the step (B) further comprises: (B3) injecting polarized nonequilibrium electrons into the MGM, wherein the polarized electrons are polarized in the direction opposite to the direction of magnetization of the MGM, and wherein propagation of the polarized nonequilibrium electrons in the MGM causes generation of the nonequilibrium magnons.

In one embodiment of the present invention, the step (B) further comprises: (B4) pumping substantially sufficient number of nonequilibrium electrons into the MGM to cause generation of the nonequilibrium magnons in the MGM.

In one embodiment of the present invention, the step (B) further comprises: (B5) pumping a threshold number of polarized nonequilibrium electrons into the MGM, wherein the threshold number of pumped polarized nonequilibrium electrons is substantially sufficient to generate a magnon avalanche effect in the MGM.

In one embodiment of the present invention, the step (B) further comprises: (B6) injecting substantially sufficient number of nonequilibrium electrons into the MGM to cause generation of the nonequilibrium magnons in the MGM.

In one embodiment of the present invention, the step (B) further comprises: (B7) injecting a threshold number of polarized nonequilibrium electrons into the MGM, wherein the threshold number of pumped polarized nonequilibrium electrons is substantially sufficient to generate a magnon avalanche effect in the MGM.

One more additional aspect of the present invention is directed to a method for generation of nonequilibrium magnons by using a four-level magnon laser.

In one embodiment, the method of the present invention for generation of nonequilibrium magnons by using a four-level magnon laser comprises: (A) providing the four-level magnon laser; and (B) pumping electrons into the four-level magnon laser from the lowest energy level into the highest energy level by using a pumping means.

Yet, one more aspect of the present invention is directed to a method for generation of nonequilibrium magnons by using a three-level magnon laser.

In one embodiment, the method of the present invention for generation of nonequilibrium magnons by using a three-level magnon laser comprises: (A) providing the three-level magnon laser; and (B) injecting electrons into the highest energy level of the three-level magnon laser from an external source of electrons by using an injection means.

Yet, an additional aspect of the present invention is directed to a method for generation of terahertz radiation by using a GS magnon laser.

In one embodiment, the method of the present invention for generation of terahertz radiation by using a GS magnon laser further comprises: (A) providing a MGM; wherein the MGM supports generation of nonequilibrium magnons; (B) generating the nonequilibrium magnons in the MGM; and (C) generating terahertz photons by using merging processes between the generated nonequilibrium magnons in the MGM.

Yet, another additional aspect of the present invention is directed to a method for generation of terahertz radiation by using a four-level magnon laser.

In one embodiment, the method of the present invention for generation of terahertz radiation by using a four-level magnon laser further comprises: (A) providing the four-level magnon laser; (B) pumping electrons into the four-level magnon laser; (C) generating nonequilibrium magnons in the four-level magnon laser; and (D) generating terahertz photons by using merging processes between generated nonequilibrium magnons in the four-level magnon laser.

Yet, one more additional aspect of the present invention is directed to a method for generation of terahertz radiation by using a three-level magnon laser.

In one embodiment, the method of the present invention for generation of terahertz radiation by using a three-level magnon laser further comprises: (A) providing the three-level magnon laser; (B) injecting electrons into the three-level magnon laser; (C) generating nonequilibrium magnons in the three-level magnon laser; and (D) generating terahertz photons by using merging processes between generated nonequilibrium magnons in the three-level magnon laser.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference now will be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific-details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of particles and quasi-particles interactions, procedures, equations, blocks, diagrams, and other symbolic representations of physical processes. These descriptions and representations are the means used by those skilled in the art of physics of condensed matter to most effectively convey the substance of their work to others skilled in the art.

The present invention discloses several embodiments of a magnon laser and its application for generation of terahertz waves.

I. General Idea

The electrons in a ferromagnetic semiconductor can be divided into two groups: free electrons, which determine the electrical conductivity of the semiconductor, and electrons localized at the ions (d- or f-electrons), which determine its magnetic properties.

The main interaction between these two groups of electrons is the exchange interaction, which lift the spin degeneracy of the electrons. The conduction (valence band) splits into two subbands with spin up (along the magnetization) and spin down, with an exchange gap $\Delta = 2I<S_z>$, where I is the exchange energy of the conduction electrons and the localized spins, and $<S_z>$ is the mean value of the localized spins. At temperatures much lower than the Curie temperature, Tc, the mean value of the localized spins $<S_z>$ is temperature independent: $<S_z>=S$.

The exchange gap $\Delta$ is usually larger than 0.1 eV. For example, for EuO the exchange gap is: $\Delta=0.6$ eV. For the reference, please see: J. Lascaray, J. P. Desfours, and M. Averous, Sol. St. Com. 19, 677 (1976).

Figure 1:
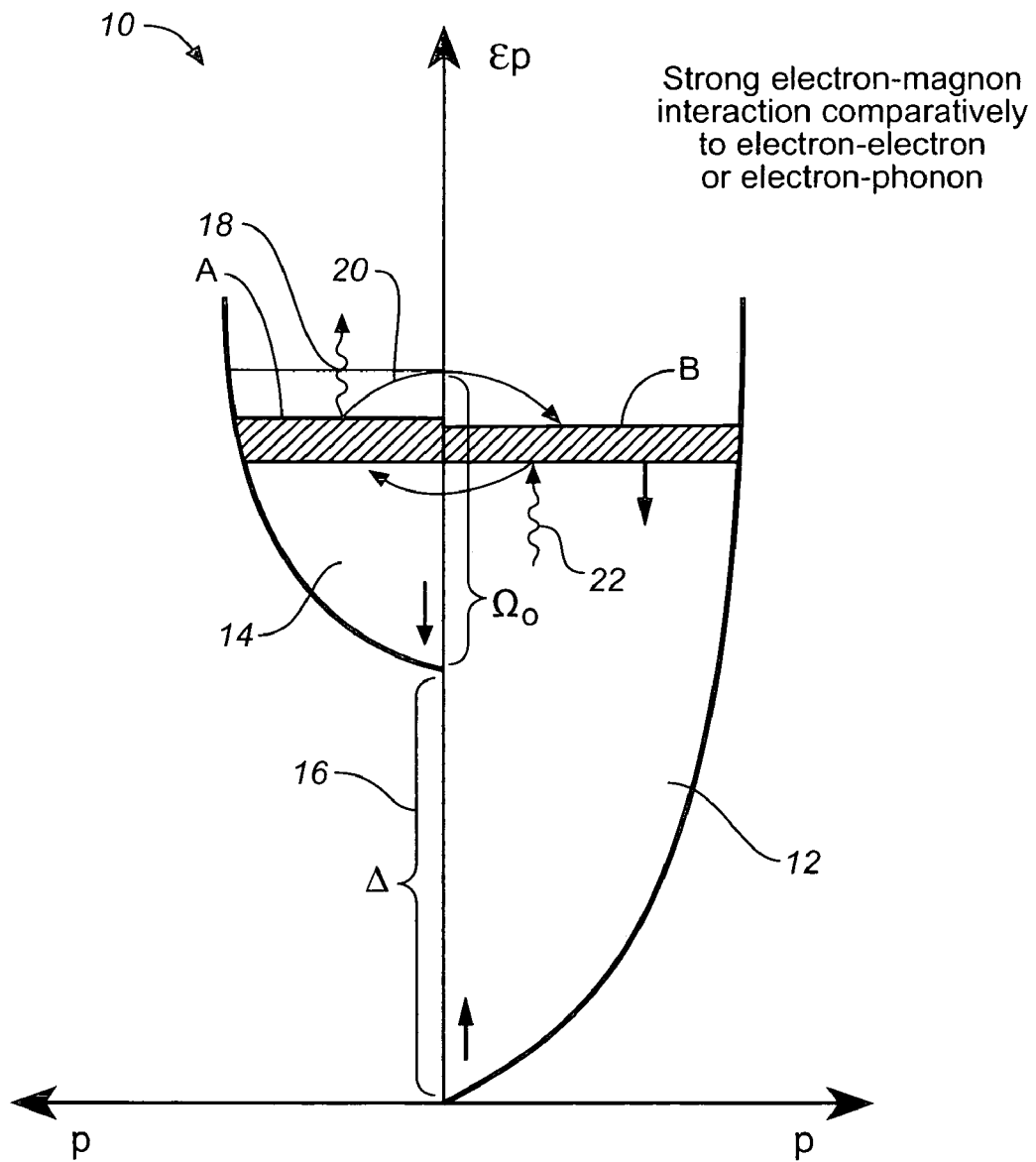
FIG. 1 illustrates process of strong electron-magnon interaction (comparatively with electron-electron or with electron-phonon interaction) wherein a nonequilibrium electron put in the upper subband with spin down rapidly emits a magnon with a large wave vector for the purposes of the present invention.

If the exchange energy is positive, I>0, then the bottom of the subband with spin up 12 is located below the bottom of the subband with spin down 14 (FIG. 1). Usually in ferromagnetic semiconductors the gap $\Delta$ 16 (of FIG. 1) is much larger than the maximum of $\{Tc, E_f\}$, where $E_f$ is the Fermi energy of the electrons. Therefore, only the states in the lower subband are occupied in equilibrium, i.e. the electrons are fully polarized.

A nonequilibrium electron 20 put in the upper subband with spin down rapidly emits a magnon 18, with a large wave vector $q \approx \hbar^{-1}(2\, m\Delta)^{1/2}$, where m is the electron effective mass. It follows from the energy and momentum conservation laws that if the energy of this electron, $\epsilon_p$, measured from the bottom of the spin down subband is much smaller than $\Delta$, the wave vector of the emitted magnon, q lies in the interval $q_1 \leq q \leq q_2$, where $q_{1,2}=\hbar^{-1}(p_0 \pm p)$, $p_0=(2m\Delta)^{1/2}$, $p=(2\, m\, \epsilon_p)^{1/2} << p_0$. The frequency of these magnons may be in the Terahertz region.

For EuO, the values of electron mass m are inconsistent according to different references. According to one reference, (J. Shoenes and P. Wachter, Phys. Rev. B 9, 3097 (1974)), $m=0.35\, m_0$, $m_0$ is the free electron mass, and the wave vector of the excited magnons $q \cdot q_0 = \hbar^{-1} p_0 = 2.6\, 10^7$ cm$^{-1}$. The spin-wave stiffness $D=10.8\, 10^{-16}$ mev·cm$^2$. (Please, see L. Passel, O. W. Dietrich and J. Als-Nielsen, Phys. Rev. B 14, 4897, 1976). This gives the energy of the excited magnons $\hbar\omega=Dq^2=0.73$ meV, and the frequency $f_m=\omega/2\pi=0.19$ THz. Merging of two magnons with frequency f and wave vectors $\vec{q}$ and $(-)\vec{q}$ generates a photon with frequency 2 f (for the reference, please see M. I. Kaganov and V. M. Tsukernik, Sov. Phys.-JETP 37, 587 (1960)). Thus, in the above given example, the frequency of the emitted radiation is: $f_r=2\, f_m=0.38$ THz.

On the other hand, according to another reference (I. Ya. Korenblit, A. A. Samokhvalov and V. V. Osipov, in Sov. Sc. Rev. A, Physics, 8, 447. Harwood Ac. Publ., UK, 1987), the electron mass value in EuO is quite different: $m=1.5\, m_0$. If this is the case, one obtains a quite different value for the radiation frequency: $f_r=1.6$ THz.

More generally, consider a ferromagnetic semiconductor with $\Delta \approx 0.2$ eV, and $m=0.3\, m_0$. Then we have $q_0=1.4\, 10^7$ cm$^{-1}$. The magnon frequency $\hbar\omega(q_0) \approx kTc\, (q_0 a)^2$, where k is the Boltzman constant, and a is the lattice constant. With Tc $\approx (100-300)$ K and $a \approx 3-5 \times 10^{-8}$ cm, the magnon frequency is $f_m \approx 1.6$ THz, and the radiation frequency $f_r \approx 2.0$ THz.

The ratio of the magnon generation rate, $\Gamma_e(\vec{q})$, to the rate of $\Gamma_m(\vec{q})$, their relaxation (in collisions with equilibrium magnons) is a function of the wave vector $\vec{q}$. Therefore the nonequilibrium magnon distribution function, $N(\vec{q})$ has a maximum at some wave vector $\vec{q}=\vec{q}*$. $N(\vec{q})$ increases with the increase of the electron pumping, and because of the simulated emission of magnons, the function $N(\vec{q})$ grows most rapidly at $\vec{q}$ close to $\vec{q}*$. When the pump reaches some critical value, $N(\vec{q}*)$ starts to increase very fast with the increase of the electron pumping. At some conditions the generation of magnons with $\vec{q}=\vec{q}*$ becomes avalanche-like, and the magnon system becomes unstable. For more details, please see references: I. Ya. Korenblit and B. G. Tankhilevich, Sov. Phys.-JETP, 46, 1167 (1977); I. Ya. Korenblit and B. G. Tankhilevich, Sov. Phys.-JETP Lett. 24, 555 (1976); I. Ya. Korenblit and B. G. Tankhilevich, Phys. Lett. A 64, 307 (1977), and equations below. As a result an intense Terahertz radiation can be obtained.

II. Basic Equations for Magnon Generation.

The system of equations which govern the behavior of the electron, $f\downarrow(\vec{p})$, and magnon, $N(\vec{q})$ distribution functions were obtained in the following paper: I. Ya. Korenblit and B. G. Tankhilevich, Sov. Phys.-JETP, 46, 1167 (1977). They read $$[1+N(\vec{q})]\Gamma_e(\vec{q})] - [N(\vec{q})-N^{(0)}(\vec{q})]\Gamma_m(\vec{q}) = 0 \quad \text{(Eqs. 1)}$$

$$f_\downarrow(\vec{p})\gamma_{em}(\vec{p}) = g(\varepsilon_p).$$

Here $\Gamma_e(\vec{q})]$ is the rate of relaxation of magnons in collisions with electrons $$\Gamma_e(\vec{q}) = 4\pi\hbar^{-1}I^2Sv_0\int d^3p(2\pi\hbar)^{-3}\delta(\gamma_{\uparrow}(\vec{p}-\hbar\vec{q})|\epsilon_{\vec{p}\downarrow}- \hbar\omega_{\vec{q}}-\epsilon_{\vec{p}-\hbar\vec{q},\uparrow})f_\downarrow(\vec{p}), \quad \text{(Eq. 2)}$$

where $v_0$ is the unit cell volume.

$\gamma_{em}$ is the electron-magnon relaxation rate:

$$\gamma_{em}(\vec{p}) = 4\pi\hbar^{-1}I^2Sv_0\int d^3q(2\pi\hbar)^{-3}\delta(\gamma_{\uparrow}(\vec{p}-\hbar\vec{q})|\epsilon_{\vec{p}\downarrow}-\hbar\omega_{\vec{q}}-\epsilon_{\vec{p}-\hbar\vec{q},\downarrow})(1N(\vec{q})), \quad \text{(Eq. 3)}$$

The smeared δ-function, δ(γ|ε), takes into account the finite lifetime of the electrons in the final state, caused by the interaction with optical phonons, which may be strong in ferromagnetic semiconductors, with an essential ionicity contribution to the chemical bonds. We have $$\delta(\gamma \mid \varepsilon) = \frac{1}{\pi}\frac{\hbar\gamma}{(\varepsilon^2+\hbar^2\gamma^2)} \quad \text{(Eq. 4)}$$

The rate $\gamma_\uparrow(p, \epsilon_p)$ is the known electron damping rate due to the emission of longitudinal optical phonons (22 of FIG. 1). For electrons with energy $\epsilon_p$ close to Δ, this rate is given by $$\gamma_8(\epsilon_p) = (\pi/2)\alpha\Omega(\Omega/\Delta)^{1/2}\ln(4\Delta/\Omega) \ll \Delta. \quad \text{(Eq. 5)}$$

Here Ω is the energy of an optical phonon, and α is the strength of the electron-phonon interaction.

The function g(ε) is the generation function of electrons, with spin down. We shall treat it as a δ-function $$g(\epsilon_p) = g_0\epsilon\delta(\epsilon-\epsilon_p). \quad \text{(Eq. 6)}$$

We suppose in what follows that the energy ε is small, ε<<Δ.

The second term in the l.h.s. in the first of Eqs. (1) describes the relaxation of nonequilibrium magnons in collisions with equilibrium ones, under the assumption that $N(\vec{q})$, is close to its equilibrium value, $$N^{(0)}(\vec{q}) = [e^{(\hbar\omega_q/kT)}-1]^{-1}. \quad \text{(Eq. 7)}$$

$\Gamma_m(\vec{q})$ is the magnon-magnon relaxation rate. From Eqs. (1) we obtain the following integral equation for $N(\vec{q})$, $$N(\vec{q}) = (N^0(\vec{q})+\Gamma_e(\vec{q})/\Gamma_m(\vec{q}))(1-\Gamma_e(\vec{q})/\Gamma_m(\vec{q}))^{-1}, \quad \text{(Eq. 8)}$$

where $$\Gamma_e(\vec{q}) = g_0\epsilon\int d^3p\delta(\gamma_{\uparrow}(\vec{p}-\hbar\vec{q})|\epsilon_{\vec{p}\downarrow}-\hbar\omega_{\vec{q}}-\epsilon_{\vec{p}-\hbar\vec{q},\uparrow})\delta(\epsilon-\epsilon_p)Z^{-1}(\vec{p}), \quad \text{(Eq. 9)}$$

and $$Z(\vec{p}) = \int d^3q\delta(\gamma_{\uparrow}(\vec{p}-\hbar\vec{q})|\epsilon_{\vec{p}\downarrow}-\hbar\omega_{\vec{q}}-\epsilon_{\vec{p}-\hbar\vec{q},\uparrow}) \quad \text{(Eq. 10)}$$

Eq. (8) is formally reminiscent of the expression for the magnon distribution function under conditions of parametric pumping. The difference is that here the rate $\Gamma_e$ is itself a functional of $N(\vec{q})$, since the number of the emitted magnons depends on the distribution function of the electrons with spin down, $f_\downarrow$, which according to Eqs. (2) and (3) is in its turn determined not only by the pump $g(\epsilon_p)$ but also by a certain average (10) over the magnon distribution function. The behavior of $N(\vec{q})$ is therefore different from that in the case of parametric pumping.

III. $N(\vec{q})$ for Strong Pumping (A) Isotropic Case.

Let us assume for simplicity that the magnon and electron spectra are isotropic. Then $\Gamma_e(q)$ and $\Gamma_m(q)$ do not depend on the direction of $\vec{q}$.

The relaxation rate Γ(q) is usually a power function of q, and it can be written as $$\Gamma_m(q) = \Gamma_m(p_0)(\hbar q/p_0)^t. \quad \text{(Eq. 11)}$$

More specifically, if $\Gamma_m(q)$ is determined by magnon-magnon exchange scattering, then t=4 for magnons, with energy $\hbar\omega(q_0)$ larger than kT, and t=3 for magnons, with energy $\hbar\omega(q_0)$ smaller than kT.

The strong pumping regime sets in, when $g_0$ exceeds a critical value $G_c$. If the damping of electrons by optical phonons is less than $(\epsilon\Delta)^{1/2}$, this critical value is given by $$G_c = 2g_c/(t+1),$$

$$g_c = (\Delta/\epsilon)^{3/2}\Gamma_m(q_0)[1+N^{(0)}(q_0)]. \quad \text{(Eqs. 12)}$$

At $g_0 > G_c$ the function N(q) increases exponentially with pumping $$N(q) = [1+N^{(0)}(q_0)](p_0/2p_\epsilon(t+1))\exp(g_0/G_c), \quad \text{(Eq. 13)}$$

if q falls into the smooth region $$p_0-p_\epsilon \leq \hbar q \leq p_0-p_{\epsilon+\delta}\hbar_q,$$

$$\delta\hbar_q = 2p_\epsilon\exp(-g_0/G_c), \quad \text{(Eqs. 14)}$$

while N(q) with wave vectors outside of the above-given range does not depend on the pump.

Thus, under sufficiently strong pumping the magnon distribution function has a sharp peak at $\hbar q \approx p_0 - p_\epsilon$.

Let us define the number of electrons, β, pumped per second per unit cell as:

$$\beta = v_0(2\pi\hbar)^{-3}\int d^3pg(\epsilon_p). \quad \text{(Eq. 15)}$$

One gets for the pumping given by Eq. (6)

$$\epsilon = (v_0\epsilon^{3/2}m^{3/2}g_0/2^{1/2}\pi^2\hbar^3) \quad \text{(Eq. 16)}$$

and the critical pumping $\beta_c$, with $g_0 = G_c$ is $$\beta_c = (v_0q^30/(2(t+1)\pi^2))\Gamma_m(q_0)[1+N^{(0)}(q_0)]. \quad \text{(Eq. 17)}$$

Since we are interested in high-frequency magnons, we suppose that their relaxation is mainly due to four-magnon exchange interaction. Using the expressions for $\Gamma_m$ given in the following reference (V. G. Vaks, A. I. Larkin and S. A. Pikin, JETP 53 (1967)), we estimated for $T/T_c \approx 0.2$, and $\hbar\omega(q_0) > kT$, $N^{(0)}(q_0) << 1$: $\Gamma_m \approx (10^8-10^9)$ sec$^{-1}$.

Thus, it follows from Eq. (17) the estimate $\beta_c \approx (10^5-10^7)$ sec$^{-1}$, and we took into account that $N^{(0)}(q_0)$ is small.

To get a sense of these estimates, we consider a model, in which the spin-down electrons are emitted into their active region across the surface area 1 cm$^2$. The lattice constant a of EuO is approximately $5\times10^{-8}$ cm, i.e. the unit cell volume is approximately $v_0 \approx 10^{-22}$ cm$^3$. The critical value $N_e = \beta_c \times v_0 \approx (10^{28}-10^{29})$ cm$^{-3}$ sec$^{-1}$. This is the number of electrons, which should cross the edge in one second to achieve the critical number of emitted magnons in a volume of 1 cm$^3$. However, electrons will emit magnons at a short distance from the edge, which can be estimated in the following way.

The electron-magnon frequency $\gamma_{em}$ is of order $3\times10^{12}$-$10^{13}$ sec$^{-1}$. The velocity of electrons with energy of order of $10^{-2}\Delta$ is $5\times10^6$-$10^7$ cm×sec$^{-1}$. This gives the mean free path of electrons with respect to magnon emission as: $l \approx 10^{-6}$ cm. Thus, all electrons entering a sample (including a magnon gain medium) across a selected side will emit magnons at this distance from that side. Therefore, only the region of width $l$ is active, and we get for the current density $j=N_e \times l$ electrons/sec×cm$^2$. The charge of an electron is $1.6\times10^{-19}$ Q. Taking into account that $1\times$Q/sec=1A, we finally get: $j=10^4$-$10^5$ A/cm$^2$. Current densities of order $10^5$-$10^6$ A/cm$^2$ are easy to achieve in semiconductors. In a pulse regime one can obtain current densities j as high as: $j=10^9$ A/cm.

The physical meaning of the critical pumping $G_c$ can be understood as follows. The ratio $\Gamma_e/\Gamma_m$ of the rate of generation of the magnons to the rate of their relaxation reaches its maximum value at $\hbar q = p_0 - p_\epsilon$ and has its minimum at $\hbar q = p_0 + p_\epsilon$, i.e. there is an excess generation on the left end of the interval in comparison with the right end. Stimulated emission causes the increase of this asymmetry. Nonlinear generation begins when the difference between the number of nonequilibrium magnons at the ends of the generation interval becomes equal to the number of equilibrium magnons, if $N^{(0)}>1$. On the other hand, nonlinear generation begins when the difference between the number of nonequilibrium magnons at the ends of the generation interval becomes equal to 1, if the opposite inequality ($N^{(0)}<1$) holds.

If the electron damping due to optical phonon scattering is large, $\hbar\gamma_\uparrow >> (\epsilon\Delta)^{1/2}$, the critical pumping, $G_c'$ is smaller than gc given by Eq. (12).

$$G_c' = \pi g_c \gamma_\uparrow / \Delta. \qquad (Eq.\ 18)$$

The function N (q) in the critical region increases as $g_0^2$, and the wave-vector interval of generated magnons decreases as $1/g_0$:

$$N(q) = [1+N^{(0)}(q)](g_0/G_c')^2. \qquad (Eq.\ 19)$$

One should stress that only the main generation regimes are taken into account herein. More details can be found in the following reference: I. Ya. Korenblit and B. G. Tankhilevich, Sov. Phys.-JETP, 46, 1167 (1977).

B. Effect of Anisotropy. Instability of the Magnon System.

If the ratio of the generation rate $\Gamma_e(\vec{q})$ to the relaxation rate $\Gamma_m(\vec{q})$ depends on the direction of the wave vector $\vec{q}$, then in the nonlinear regime the stimulated emission of magnons results in the strong anisotropy of magnon distribution function. As an example, one can consider the anisotropy of $\Gamma_e(\vec{q})/\Gamma_m(\vec{q})$ caused by the anisotropy of the magnon spectrum. The spectrum of magnons with q close to $p_0/\hbar$ can be written as $$\omega_q = Dq^2(1+\Lambda \sin^2\theta), \qquad (Eq.\ 20)$$

where $$\Lambda = 2\pi g \mu_B M_s/\omega_{p0} << 1, \qquad (Eq.\ 21)$$

$M_s$ is the magnetization, $\theta_{\vec{q}}$ is the angle between the vectors $\vec{q}$ and $\vec{M}_s$. If the inequality $\hbar\omega(q_0)<kT$ holds, then the anisotropy of $\Gamma_e(\vec{q})/\Gamma_m(\vec{q})$ implies that the generation is the largest at some angle $\theta$.

Consider the situation, when the damping is large, i.e. $\hbar\gamma_\uparrow >> (\epsilon\Delta)^{1/2}$. Since the anisotropy is small ($\Lambda<<1$), the anisotropy becomes effective only at sufficiently strong pumping, larger than the critical one, Eq. (18). At $g=G_c$ given by this equation, the number of magnons starts to increase as in the isotropic case. If one assumes that the basic equations (Eqs. 1), describing the generation of magnons close to equilibrium, are valid also beyond the critical pumping, one can reveal the role of small anisotropy.

As shown in the following reference: I. Ya. Korenblit and B. G. Tankhilevich, Sov. Phys.-JETP, 46, 1167 (1977), the maximum generation takes place for magnons with $\theta$ close to zero and q close to $p_0$. If the pumping reaches the critical value g*

$$g^* = \pi^2 \hbar \gamma_\uparrow g_c / 2\Lambda^{1/2}\Delta, \qquad (Eq.\ 22)$$

the function $N(\vec{q})$ becomes $$N(\vec{q}) = N^{(0)}(\vec{q})\left[1 + \Lambda\sin^2(\theta) - \frac{\hbar^2\gamma_\uparrow^2}{((\Delta-\epsilon_q)^4 + \hbar^2\gamma_\uparrow^2)}\left(\frac{p_0}{\hbar q}\right)^2\right]^{-1} \qquad (Eq.\ 23)$$

where $\epsilon_q = \hbar^2 q^2/2m$.

We get at $\hbar q = p_0$, i.e. at $\epsilon_q = \Delta$ $$N(\vec{q}) = N^{(0)}(\vec{q})/\Lambda \sin^2(\theta_{\vec{q}}) \qquad (Eq.\ 24)$$

At $\theta = 0$ the denominator of this expression goes to zero. The steady solution of Eqs. (1) exists only at pumping levels below g*. When the pumping level reaches the critical value g*, an avalanche-type growth of the number of magnons occurs, whereas the wave vectors of these nonequilibrium anisotropic magnons are directed along the magnetization and are equal to $p_0$.

Note, that at sufficiently low temperatures the three-magnon dipole scattering may be more important then the discussed above four-magnon exchange scattering. However, the three-magnon scattering probability, as opposed to the four-magnon exchange scattering probability, is a highly anisotropic one and is proportional to $\sin^2\theta\cos^2\theta$. If this is the case, one should expect an instability of magnons with $\theta=0$ and $\theta=\pi/2$.

The disclosed above phenomena can be described in very general terms as a general structure (GS) magnon laser further comprising: (A) a magnon gain medium (MGM); wherein the MGM supports generation of nonequilibrium magnons; and (B) a means for generating the nonequilibrium magnons in the MGM. In one embodiment, the GS magnon laser of the present invention further comprises: (C) a thermostat (not shown), wherein the MGM is placed in the thermostat, and wherein the thermostat is configured to maintain temperature of the MGM below a critical temperature. In one embodiment of the present invention, the MGM is selected from the group consisting of: {ferromagnetic semiconductor; ferromagnetic insulator; and ferromagnetic material}. In one embodiment of the present invention, the means (B) further comprises: a means (B1) configured to pump nonequilibrium electrons into the MGM, wherein propagation of the nonequilibrium electrons in the MGM causes generation of the nonequilibrium magnons.

Figure 2:
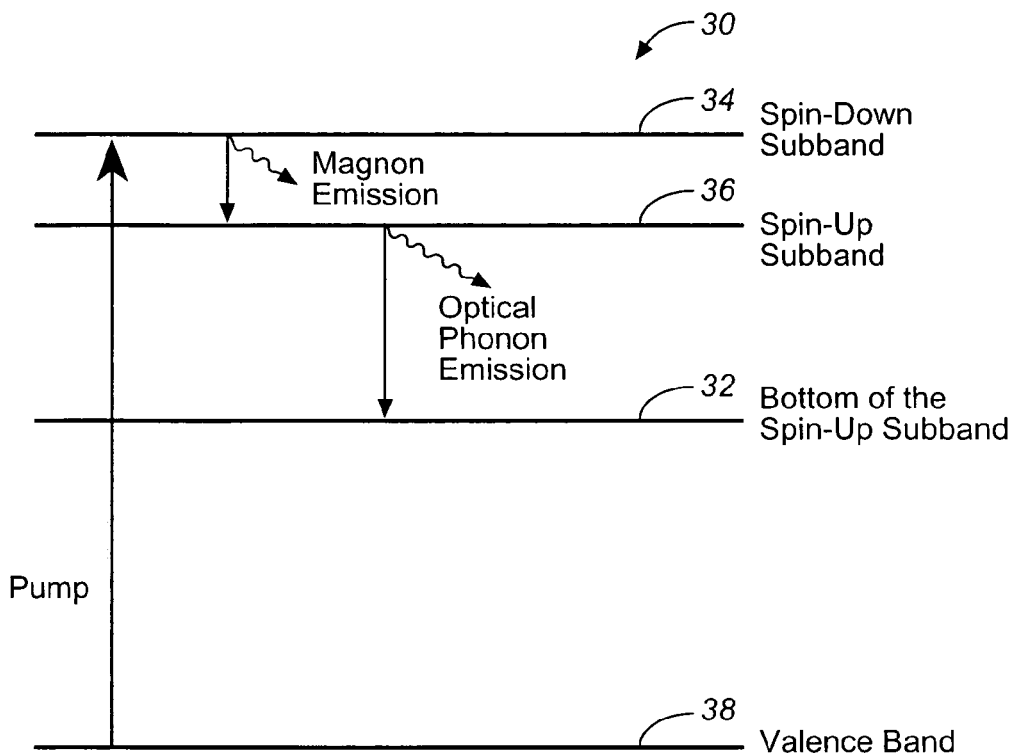
FIG. 2 shows the energy level structure of a four-level magnon laser.

In another embodiment, FIG. 2 shows a diagram 30 that illustrates a four-level magnon laser of the present invention. In this embodiment of the present invention, the four-level magnon laser 30 further comprises a four-level energy structure further comprising: a lowest energy level 38 corresponding to a valence band, a highest energy level 34 corresponding to a spin-down subband, a first intermediate level 36 corresponding to the lower energy electron states in the spin-up subband, and a second intermediate energy level 32 corresponding to a spin-up subband. The electrons pumped from the lowest energy level 38 into the highest energy level 34 move into the lower energy electron states (the first intermediate level 36) in the spin-up subband, wherein each pumped electron emits a magnon. The electrons in the spin-up subband move from the first intermediate state 36 into the bottom of the spin-up subband (the second intermediate energy level 32) by emitting optical phonons. The electrons are pumped from the lowest energy level 38 into the highest energy level 34 by using a pumping means (not shown). In one embodiment of the present invention, a conventional laser can be used as a pumping means to pump electrons form the lowest energy level (valence band) 38 into the highest energy level 34 (spin-down subband).

In one embodiment of the present invention, the four-level magnon laser (30 of FIG. 2) further comprises: a thermostat (not shown), wherein the ferromagnetic material is placed in the thermostat, and wherein the thermostat is configured to maintain temperature of the ferromagnetic material below a critical temperature.

Figure 3:
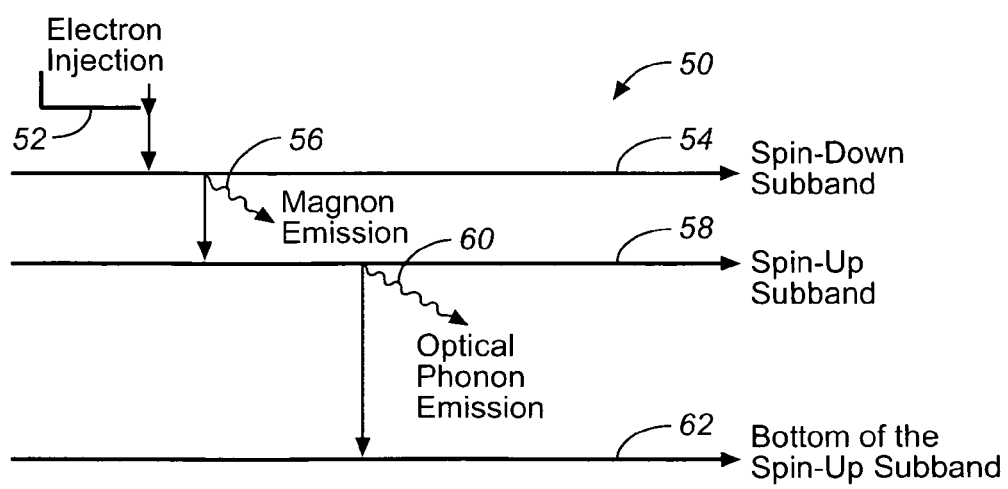
FIG. 3 depicts the energy level structure of a three-level magnon laser.

In one more embodiment, FIG. 3 depicts a three-level magnon laser 50 of the present invention further comprising a three-level laser structure further comprising: a highest energy level 54 corresponding to a spin-down subband, a lowest energy level 62 corresponding to a spin-up subband, and an intermediate energy level 58 corresponding to the lower energy electron states in the spin-up subband. In this embodiment of the present invention, the electrons 52 injected from an external source of electrons (not shown) into the highest energy level 54 move into the lower energy electron states in the spin-up subband 58, wherein each injected electron emits a magnon. The electrons in the spin-up subband move from the intermediate energy level 58 into the bottom of the spin-up subband 62 by emitting optical phonons.

In one embodiment of the present invention, the injection means (not shown) further comprises: an electric field applied to the ferromagnetic material. In one embodiment of the present invention, the injection means is configured to inject non-polarized electrons from an external source into the ferromagnetic material, wherein the injected spin-down electrons populate the highest energy level 54. In another embodiment of the present invention, the injection means is configured to inject polarized spin-down electrons from an external source into the highest energy level 54. The polarized spin-down electrons are polarized in the direction opposite to the direction of magnetization of the ferromagnetic material.

In one embodiment, the three-level magnon laser of the present invention (50 of FIG. 3) further comprises a thermostat (not shown), wherein the ferromagnetic material is placed in the thermostat, and wherein the thermostat is configured to maintain temperature of the ferromagnetic material below a critical temperature.

IV. Generation of THz Radiation.

The GS magnon laser of the present invention (as well as the four-level magnon laser of the present invention, and as well as the three-level magnon laser of the present invention) can be used for generation of THz radiation.

Indeed, merging of two magnons with wave vectors q and q' generates a photon with wave vector $$\vec{k} = \vec{q} + \vec{q}\,' \quad \text{(Eq. 25)}$$

and with frequency $v_k$ equal to $$\omega_q + \omega_{q'} = v_k = ck, \quad \text{(Eq. 26)}$$

where c is the light velocity.

It follows from these conservation laws that k is much smaller than q, i.e. $\vec{q} = -\vec{q}\,'$. (M. I. Kaganov and V. M. Tsukernik, Sov. Phys.-JETP 37, 587 (1960)).

Using the results of the same reference: M. I. Kaganov and V. M. Tsukernik, Sov. Phys.-JETP 37, 587 (1960), one can derive the rate of the change of the photon distribution function, n(v) in the following way:

$$dn(v)/dt = \quad \text{(Eq. 27)}$$
$$W \int d\theta \cdot \sin^5\theta [N^2(v/2, \theta) \cdot (n(v)+1) - n(v)(N(v/2, \theta)+1)^2] - \frac{n(v) - n^{(0)}(v)}{\tau_{ph}},$$

Here $$W = \frac{\mu^2 q_0^3}{2\hbar} \cdot \left(\frac{4\pi g \mu M_s}{\hbar v}\right)^2, \quad \text{(Eq. 28)}$$

where μ is the Bohr magneton. The last term in the (Eq. 27) describes the relaxation of generated photons, and $\tau_{ph}$ is the photon relaxation time.

For EuO, with $q_0 = 2.6 \times 10$ cm$^{-1}$, $\hbar v = 1.5$ meV, and $4\pi M_S = 24 \times 10^3$ Gs, one obtains $W = 2 \times 10^7$ sec$^{-1}$.

If the magnon distribution function is isotropic, one can perform the integration in Eq. (27) and one gets the following equation:

$$dn(v)/dt = \quad \text{(Eq. 29)}$$
$$(16/15) \cdot W \cdot [N^2(v/2) - 2n(v) \cdot N(v/2) - n(v)] - \frac{n(v) - n^{(0)}(v)}{\tau_{ph}}.$$

By analyzing this equation, it is clear that at the initial stage of generation, when n is smaller than N, the number of photons increases as $N^2$ provided the photon relaxation is sufficiently small. With the increase of n, the negative terms in Eq. (29) become significant, and the photons reach a steady state, with dn/dt=0. If this is the case, we have the following expression for the number of photons n at the steady state:

$$n = \frac{n^{(0)} + w\tau_{ph}N^2}{1 + (2N+1)w\tau_{ph}}, \quad \text{(Eq. 30)}$$

where w=16 W/15.

If $\omega\tau_{ph}$ is large, $w\tau_{ph} \gg 1/N$, the number of photons is as follows:

$$n = \frac{N^2}{2N+1} \approx \frac{N}{2}.$$ Eq. (31)

If, on the other hand, $1/N^2 \ll \omega\tau_{ph} \ll 1/N$, the number of photons is as follows:

$$n = w\tau_{ph}N^2, 1 \ll n \ll N.$$ Eq. (32)

Finally, if the relaxation of photons is very fast, $w\tau_{ph}N^2 \ll 1$, the pumping is inefficient, and $$n \approx n^{(0)}.$$ Eq. (33)

V. Applicable Materials.

The MGM of the present invention can be implemented by selecting any material that supports generation of substantial number of nonequilibrium magnons that by merging into photons generate THz photons. For example, ferromagnetic semiconductors (europium chalcogenides and chalcogenide spinels), and/or ferromagnetic isolators, can be used to implement the MGM of the present invention.

VI. Pumping Methods.

To implement the GS magnon laser of the present invention, one could use a conventional laser pumping means, as well as an electron injection means. To implement the four-level magnon laser of the present invention (30 of FIG. 2), one could use a conventional laser pumping means. To implement the three-level magnon laser of the present invention (50 of FIG. 3), one could use an electron injection means.

VII. Methods of Usage.

In one embodiment, the GS magnon laser of the present invention can be used for generation of nonequilibrium magnons by performing the following steps (not shown): (A) providing an MGM that supports generation of nonequilibrium magnons; and (B) generating the nonequilibrium magnons in the MGM. Please, see given above Eqs. (1-24) that describe how the propagation of the nonequilibrium electrons in the MGM causes generation of nonequilibrium magnons.

In one embodiment, the GS magnon laser of the present invention can be used for generation of terahertz radiation by performing the following steps (not shown): (A) providing a MGM; (B) generating the nonequilibrium magnons in the MGM; and (C) generating terahertz photons by using merging processes between the generated nonequilibrium magnons in the MGM. Please, see given above Eqs. (1-33) that describe how the propagation of the nonequilibrium electrons in the MGM causes generation of nonequilibrium magnons, and how the merging of nonequilibrium magnons leads to generation of THz photons.

In one embodiment, the four-level magnon laser of the present invention (30 of FIG. 2) can be used for generation of nonequilibrium magnons by performing the following steps (not shown): (A) providing the four-level magnon laser; and (B) pumping electrons into the four-level magnon laser from the lowest energy level into the highest energy level by using a pumping means.

In one embodiment, the four-level magnon laser of the present invention (30 of FIG. 2) can be also used for generation of terahertz radiation by performing the following steps (not shown): (A) providing the four-level magnon laser; (B) pumping electrons into the four-level magnon laser; (C) generating nonequilibrium magnons in the four-level magnon laser; and (D) generating terahertz photons by using merging processes between generated nonequilibrium magnons in the four-level magnon laser.

In one embodiment, the three-level magnon laser of the present invention (50 of FIG. 3) can be used for generation of nonequilibrium magnons by performing the following steps (not shown): (A) providing the three-level magnon laser; and (B) injecting electrons into the three-level magnon laser by using an injection means.

In one embodiment, the three-level magnon laser of the present invention (50 of FIG. 3) can be also used for generation of terahertz radiation by performing the following steps (not shown): (A) providing the three-level magnon laser; (B) injecting electrons into the three-level magnon laser; (C) generating nonequilibrium magnons in the three-level magnon laser; and (D) generating terahertz photons by using merging processes between generated nonequilibrium magnons in the three-level magnon laser.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents

What is claimed is:

1. A general structure (GS) magnon laser comprising:
   (A) a magnon gain medium (MGM); wherein said MGM supports generation of nonequilibrium magnons; and
   (B) a means for injecting nonequilibrium electrons into said MGM; wherein propagation of said nonequilibrium electrons in said MGM causes generation of said nonequilibrium magnons.

2. A general structure (GS) magnon laser comprising:
   (A) a magnon gain medium (MGM); wherein said MGM supports generation of nonequilibrium magnons; and
   (B) a means for injecting nonequilibrium polarized electrons into said MGM; wherein said polarized electrons are polarized in the direction opposite to the direction of magnetization of said MGM; and wherein propagation of said polarized nonequilibrium electrons in said MGM causes generation of said nonequilibrium magnons.

3. A four-level magnon laser comprising:
   a ferromagnetic material having a conduction band that is split into two sub bands, a first said subband having spin up (along the direction of magnetization of said ferromagnetic material), and a second said subband having spin down (opposite to the direction of magnetization of said ferromagnetic material), and said ferromagnetic material further comprising:
      a four-level laser structure further comprising:
         a lowest energy level corresponding to a valence band;
         a highest energy level corresponding to a spin-down subband;
         a second intermediate energy level corresponding to a spin-up subband; wherein electrons from said lowest energy level pumped into said highest energy level move into the lower energy electron states in said spin-up subband, and wherein each said pumped electron emits a magnon; and a first intermediate level corresponding to said lower energy electron states in said spin-up subband; and wherein said electrons in said spin-up subband move into the bottom of said spin-up subband by emitting optical phonons; and wherein said second intermediate energy level is placed in said energy space lower than said first intermediate level;

and wherein said electrons are pumped from said lowest energy level into said highest energy level by using a pumping means.

4. The four-level magnon laser of claim 3 further comprising:
said pumping means configured to pump said electrons from said lowest energy level into said highest energy level.

5. The four-level magnon laser of claim 4, wherein said pumping means further comprises:
a conventional laser means configured to pump said electrons from said lowest energy level into said highest energy level.

6. The four-level magnon laser of claim 3, wherein said ferromagnetic material is selected from the group consisting of: {ferromagnetic semiconductor; and ferromagnetic insulator}.

7. The four-level magnon laser of claim 3 further comprising:
a thermostat, wherein said ferromagnetic material is placed in said thermostat, and wherein said thermostat is configured to maintain temperature of said ferromagnetic material below a critical temperature.

8. A three-level magnon laser comprising:
a ferromagnetic material having a conduction band that is split into two sub bands, a first said subband having spin up (along the direction of magnetization of said ferromagnetic material), and a second said subband having spin down (opposite to the direction of magnetization of said ferromagnetic material), and said ferromagnetic material further comprising:
a three-level laser structure further comprising:
a highest energy level corresponding to a spin-down subband;
a lowest energy level corresponding to a spin-up subband;
wherein electrons injected from an external source of electrons into said highest energy level move into the lower energy electron states in said spin-up subband, and wherein each said injected electron emits a magnon;
and
an intermediate energy level corresponding to said lower energy electron states in said spin-up subband; and wherein said electrons in said spin-up subband move from said intermediate energy level into the bottom of said spin-up subband by emitting optical phonons; and wherein said electrons are injected from said external source of electrons into said highest energy level by using an injection means.

9. The three-level magnon laser of claim 8 further comprising:
said injection means configured to inject said electrons from said external source of electrons into said highest energy level.

10. The three-level magnon laser of claim 9, wherein said injection means further comprises:
an electric field applied to said ferromagnetic material, wherein said electric field is configured to inject non- polarized electrons from an external source into said ferromagnetic material, and wherein said injected spin-down electrons populate said highest energy level.

11. The three-level magnon laser of claim 9, wherein said injection means further comprises:
an electric field applied to said ferromagnetic material, wherein said electric field is configured to inject polarized spin-down electrons from an external source into said highest energy level, wherein said polarized spin-down electrons are polarized in the direction opposite to the direction of magnetization of said ferromagnetic material.

12. The three-level magnon laser of claim 8, wherein said ferromagnetic material is selected from the group consisting of: {ferromagnetic semiconductor; and ferromagnetic insulator}.

13. The three-level magnon laser of claim 8 further comprising:
a thermostat, wherein said ferromagnetic material is placed in said thermostat, and wherein said thermostat is configured to maintain temperature of said ferromagnetic material below a critical temperature.

14. A method for generation of nonequilibrium magnons by using a GS magnon laser, said method comprising:
(A) providing a MGM; wherein said MGM supports generation of nonequilibrium magnons;
and
(B) injecting nonequilibrium electrons into said MGM; wherein propagation of said nonequilibrium electrons in said MGM causes generation of said nonequilibrium magnons.

15. A method for generation of nonequilibrium magnons by using a GS magnon laser, said method comprising:
(A) providing a MGM; wherein said MGM supports generation of nonequilibrium magnons;
and
(B) injecting polarized nonequilibrium electrons into said MGM, wherein said polarized electrons are polarized in the direction opposite to the direction of magnetization of said MGM; and wherein propagation of said polarized nonequilibrium electrons in said MGM causes generation of said nonequilibrium magnons.

16. A method for generation of nonequilibrium magnons by using a GS magnon laser, said method comprising:
(A) providing a MGM; wherein said MGM supports generation of nonequilibrium magnons;
and
(B) injecting substantially sufficient number of nonequilibrium electrons into said MGM to cause generation of said nonequilibrium magnons in said MGM.

17. A method for generation of nonequilibrium magnons by using a GS magnon laser, said method comprising:
(A) providing a MGM; wherein said MGM supports generation of nonequilibrium magnons;
and
(B) injecting a threshold number of polarized nonequilibrium electrons into said MGM, wherein said threshold number of pumped polarized nonequilibrium electrons is substantially sufficient to generate a magnon avalanche effect in said MGM.

18. A method for generation of nonequilibrium magnons by using a four-level magnon laser, said method comprising:
(A) providing said four-level magnon laser;
and
(B) pumping electrons into said four-level magnon laser; wherein said four-level magnon laser further comprises: a ferromagnetic material having a conduction band that is split into two sub bands, a first said subband having spin up (along the direction of magnetization of said ferromagnetic material), a second said subband having spin down (opposite to the direction of magnetization of said ferromagnetic material), said ferromagnetic material further comprising: a four-level laser structure further comprising: a lowest energy level corresponding to a valence band; a highest energy level corresponding to a spin-down subband; a second intermediate energy level corresponding to a spin-up subband; wherein electrons from said lowest energy level pumped into said highest energy level move into the lower energy electron states in said spin-up subband, and wherein each said pumped electron emits a magnon; and a first intermediate level corresponding to said lower energy electron states in said spin-up subband; and wherein said electrons in said spin-up subband move into the bottom of said spin-up subband by emitting optical phonons; and wherein said second intermediate energy level is placed in said energy space lower than said first intermediate level; and wherein said electrons are pumped from said lowest energy level into said highest energy level by using a pumping means.

19. A method for generation of nonequilibrium magnons by using a three-level magnon laser, said method comprising:
  (A) providing said three-level magnon laser;
  and
  (B) injecting electrons into said three-level magnon laser; wherein said three-level magnon laser further comprises: a ferromagnetic material having a conduction band that is split into two sub bands, a first said subband having spin up (along the direction of magnetization of said ferromagnetic material), a second said subband having spin down (opposite to the direction of magnetization of said ferromagnetic material), said ferromagnetic material further comprising: a three-level laser structure further comprising: a highest energy level corresponding to a spin-down subband; a lowest energy level corresponding to a spin-up subband; wherein electrons injected from an external source of electrons into said highest energy level move into the lower energy electron states in said spin-up subband, and wherein each said injected electron emits a magnon; and an intermediate energy level corresponding to said lower energy electron states in said spin-up subband; and wherein said electrons in said spin-up subband move from said intermediate energy level into the bottom of said spin-up subband by emitting optical phonons; and wherein said electrons are injected from said external source of electrons into said highest energy level by using an injection means.

20. A method for generation of terahertz radiation by using a GS magnon laser; said method comprising:
  (A) providing a MGM; wherein said MGM supports generation of nonequilibrium magnons;
  (B) generating said nonequilibrium magnons in said MGM;
  and
  (C) generating terahertz photons by using merging processes between said generated nonequilibrium magnons in said MGM.

21. A method for generation of terahertz radiation by using a four-level magnon laser, said method comprising:
  (A) providing said four-level magnon laser;
  (B) pumping electrons into said four-level magnon laser;
  (C) generating nonequilibrium magnons in said four-level magnon laser;
  and
  (D) generating terahertz photons by using merging processes between said generated nonequilibrium magnons in said four-level magnon laser.

22. A method for generation of terahertz radiation by using a three-level magnon laser, said method comprising:
  (A) providing said three-level magnon laser;
  (B) injecting electrons into said three-level magnon laser;
  (C) generating nonequilibrium magnons in said three-level magnon laser;
  and
  (D) generating terahertz photons by using merging processes between said generated nonequilibrium magnons in said three-level magnon laser.

* * * * *